US010040026B2

(12) United States Patent
Furuta et al.

(10) Patent No.: US 10,040,026 B2
(45) Date of Patent: Aug. 7, 2018

(54) FAN SCRUBBER AND VACUUM PUMP APPARATUS

(71) Applicant: EBARA CORPORATION, Tokyo (JP)

(72) Inventors: Hiroki Furuta, Tokyo (JP); Tetsuro Sugiura, Tokyo (JP); Tetsuo Komai, Tokyo (JP); Atsushi Oyama, Tokyo (JP); Takashi Kyotani, Tokyo (JP); Shinichi Sekiguchi, Tokyo (JP); Takanori Inada, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 121 days.

(21) Appl. No.: 15/201,923

(22) Filed: Jul. 5, 2016

(65) Prior Publication Data
US 2017/0007961 A1 Jan. 12, 2017

(30) Foreign Application Priority Data

Jul. 6, 2015 (JP) .................. 2015-135140

(51) Int. Cl.
B01D 53/78 (2006.01)
B01D 47/06 (2006.01)
B01D 53/38 (2006.01)
H02K 5/128 (2006.01)
H02K 5/167 (2006.01)
H02K 1/32 (2006.01)
H02K 7/14 (2006.01)

(52) U.S. Cl.
CPC ............ B01D 53/78 (2013.01); B01D 47/06 (2013.01); B01D 53/38 (2013.01); H02K 5/128 (2013.01); H02K 5/1672 (2013.01); B01D 2258/0216 (2013.01); H02K 1/32 (2013.01); H02K 7/14 (2013.01)

(58) Field of Classification Search
None
See application file for complete search history.

(56) References Cited

U.S. PATENT DOCUMENTS

| 5,902,377 A * | 5/1999 | Morgan ................. B01D 47/18 261/90 |
| 2003/0164560 A1 | 9/2003 | Okuda et al. |
| 2013/0272904 A1* | 10/2013 | Hozumi ................. F04D 29/60 417/360 |
| 2015/0000870 A1* | 1/2015 | Hosotani ................. F02C 7/08 165/104.19 |

FOREIGN PATENT DOCUMENTS

JP 2003-251130 A 9/2003

* cited by examiner

Primary Examiner — Walter Dean Griffin
Assistant Examiner — Jelitza M Perez
(74) Attorney, Agent, or Firm — Rothwell, Figg, Ernst & Manbeck, P.C.

(57) ABSTRACT

The fan scrubber is provided with a casing having a gas draw-in port and a gas ejection port, a fan disposed in the casing, a nozzle from which a liquid is jetted into the casing, and a canned motor connected to the fan. The canned motor has a main shaft connected to the fan, a rotor which rotates integrally with the main shaft, a stator disposed on the periphery of the rotor, a motor casing in which the rotor and the stator are housed, and a can which partitions the interior of the motor casing into a rotor chamber in which the rotor is disposed and a stator chamber in which the stator is disposed.

8 Claims, 6 Drawing Sheets

FAN SCRUBBER AND VACUUM PUMP APPARATUS

CROSS REFERENCE TO RELATED APPLICATION

This application claims priority to Japanese Application Number 2015-135140, filed Jul. 6, 2015, the entire content of which is hereby incorporated by reference.

TECHNICAL FIELD

The present invention relates to a fan scrubber and a vacuum pump apparatus.

BACKGROUND ART

Vacuum pump apparatuses are being widely used as one of facilities for manufacturing semiconductors, liquid crystals, solar panels, light emitting diodes (LEDs), etc. In processes for manufacturing these products, a vacuum pump is connected to a vacuum chamber and a process gas introduced into the vacuum chamber is evacuated by the vacuum pump. In some cases, the gas evacuated by the vacuum pump is a gas containing a silane gas (SiH4) or a halogen-based gas (e.g., NF3, ClF3, SF6, CHF3, C2F6 or CF4). This gas is a hazardous and combustible or persistent gas and cannot be released as it is into the atmosphere. Conventionally, in the vacuum pump apparatus, therefore, a abatement apparatus for performing processing for making the evacuated gas harmless is provided in a stage following the vacuum pump.

In some cases, a material solidified, for example, by a reaction in the vacuum chamber or a material which can solidify easily is mixed as a reaction byproduct in the process gas discharged from the vacuum pump. If such a product enters the abatement apparatus, there is a possibility of clogging in piping or in the abatement apparatus or a reduction in processing efficiency of the abatement apparatus. In some cases, therefore, a foreign substance removal mechanism for removing such a foreign substance is provided between the vacuum pump apparatus and the abatement apparatus.

For example, a filter, a trap or the like can be used as such a foreign substance removal mechanism. A filter or a trap of a simple construction is capable of removing a foreign substance but needs periodic maintenance such as filter interchange. A fan scrubber having a fan for agitating a gas, a motor for driving the fan, a nozzle for jetting a liquid is also known as a foreign substance removal mechanism. A fan scrubber captures a foreign substance with a liquid jetted from the nozzle.

CITATION LIST

Patent Literature

Patent Literature 1: Japanese Patent Laid-Open No. 2003-251130

SUMMARY OF INVENTION

In a case where the fan scrubber is provided as a foreign substance removal mechanism in a stage before the abatement apparatus, there is a possibility of an evacuated gas entering the interior of the motor through a bearing between the fan and the motor. The evacuated gas may contain a corrosive gas or a gas hazardous to the human body. If such a gas enters the interior of the motor, it becomes a cause of deterioration of the stator and other parts of the motor.

An arrangement is conceivable in which the scrubber chamber in which the fan is provided and the motor are connected to each other through a mechanical seal, a shaft coupling, etc. so that the gas does not enter the interior of the motor. The mechanical sealing, however, may be degraded by a gas contained in the evacuated gas. In such a case, the frequency of maintenance is increased and the cost of maintenance of the fan scrubber is increased. Also, in a case where shaft coupling is used, a misalignment, if any, between the main shaft of the motor and the rotating shaft of the fan is a cause of vibration and noise of the motor. Therefore, sufficient experience and a special jig are required for manufacture of the fan scrubber.

The present invention has been achieved to solve at least part of the above-described problems, and an object of the present invention is to provide a fan scrubber and vacuum pump apparatus capable of inhibiting a gas drawn into the casing from damaging the motor. Another object of the present invention is to provide a fan scrubber and vacuum pump apparatus capable of reducing the maintenance cost and simple in construction.

According to the present invention, there is provided a fan scrubber including a casing having a gas draw-in port and a gas ejection port, a fan disposed in the casing, a nozzle from which a liquid is jetted into the casing, and a canned motor connected to the fan. The canned motor has a main shaft connected to the fan, a rotor which rotates integrally with the main shaft, a stator disposed on a periphery of the rotor, a motor casing in which the rotor and the stator are housed, and a can which partitions an interior of the motor casing into a rotor chamber in which the rotor is disposed and a stator chamber in which the stator is disposed.

DESCRIPTION OF EMBODIMENTS

Figure 1:
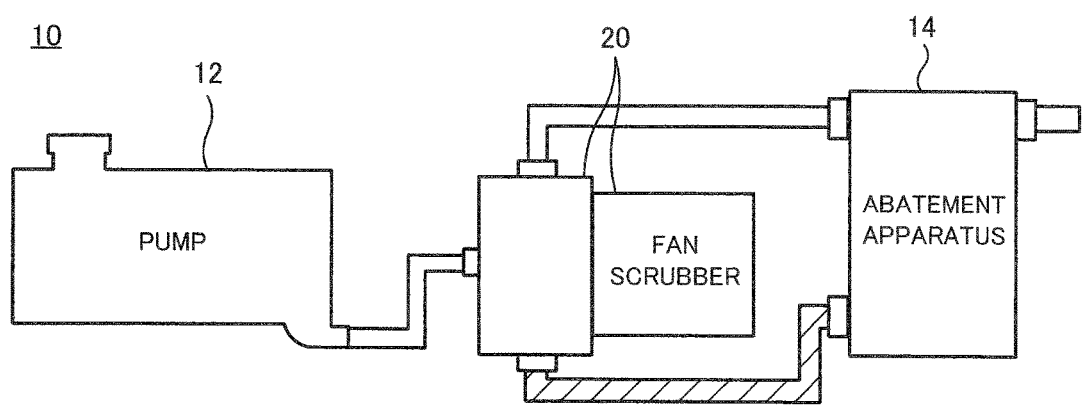
FIG. 1 is a diagram schematically showing the construction of a vacuum pump apparatus according to an embodiment of the present invention.

A fan scrubber and a vacuum pump apparatus according to one embodiment of the present invention will be described with reference to the accompanying drawings. Components identical or corresponding to each other are assigned the same reference characters in the drawings and repeated description of them is avoided. The vacuum pump apparatus in the present embodiment can be used, for example, as one of facilities for manufacturing semiconductors, liquid crystals, solar panels, LEDs, etc.

FIG. 1 is a diagram schematically showing the construction of the vacuum pump apparatus according to the present embodiment. The vacuum pump apparatus 10 according to the present embodiment is provided with a vacuum pump 12 connected to a chamber (not shown) to evacuate the chamber, a fan scrubber 20 and a abatement apparatus 14 connected in a stage subsequent to the vacuum pump 12. In the present embodiment, a dry vacuum pump, for example, is used as the pump 12.

The fan scrubber 20 is provided for the purpose of removing a foreign substance such as a solid material (e.g., a reaction byproduct) contained in a gas from the vacuum pump 12. The abatement apparatus 14 is provided for the purpose of processing for making the gas from the vacuum pump 12 harmless. One of combustion-type, dry-type, wet-type, heater-type, fluorine-fixation-type, catalyst-type and plasma-type abatement apparatuses, a dilution unit type of abatement apparatus (a blower, adding N2, adding air) etc. or certain ones of these types of apparatus can be used as the abatement apparatus 14.

In the vacuum pump apparatus 10 according to the present embodiment, the gas evacuated by the vacuum pump 12 is first led into the fan scrubber 20, and the gas having passed through the fan scrubber 20 is led into the abatement apparatus 14. This arrangement enables inhibiting a foreign substance such as a solidified material from being introduced into the abatement apparatus 14 to inhibit clogging in the abatement apparatus 14 or reduction in processing efficiency.

In the present embodiment, a liquid (waste liquid) used to capture a foreign substance with the fan scrubber 20 is introduced into the abatement apparatus 14 (see a hatched portion in FIG. 1), thereby enabling the liquid used in the fan scrubber 20 (hereinafter referred to as "cleaning liquid") to be reused in the abatement apparatus 14. The cleaning liquid may be reused in the abatement apparatus 14, for example, to capture with the abatement apparatus 14 a solidified material solidified from the gas, as in the case with the fan scrubber 20, and to perform heat exchange with the gas passing through the abatement apparatus 14. The cleaning liquid may also be used to lubricate or cool components of the abatement apparatus 14. The liquid from the fan scrubber 20 may be supplied to the abatement apparatus 14 via a mechanism for capturing a foreign substance, e.g., a filter or a trap.

First Embodiment

Figure 2:
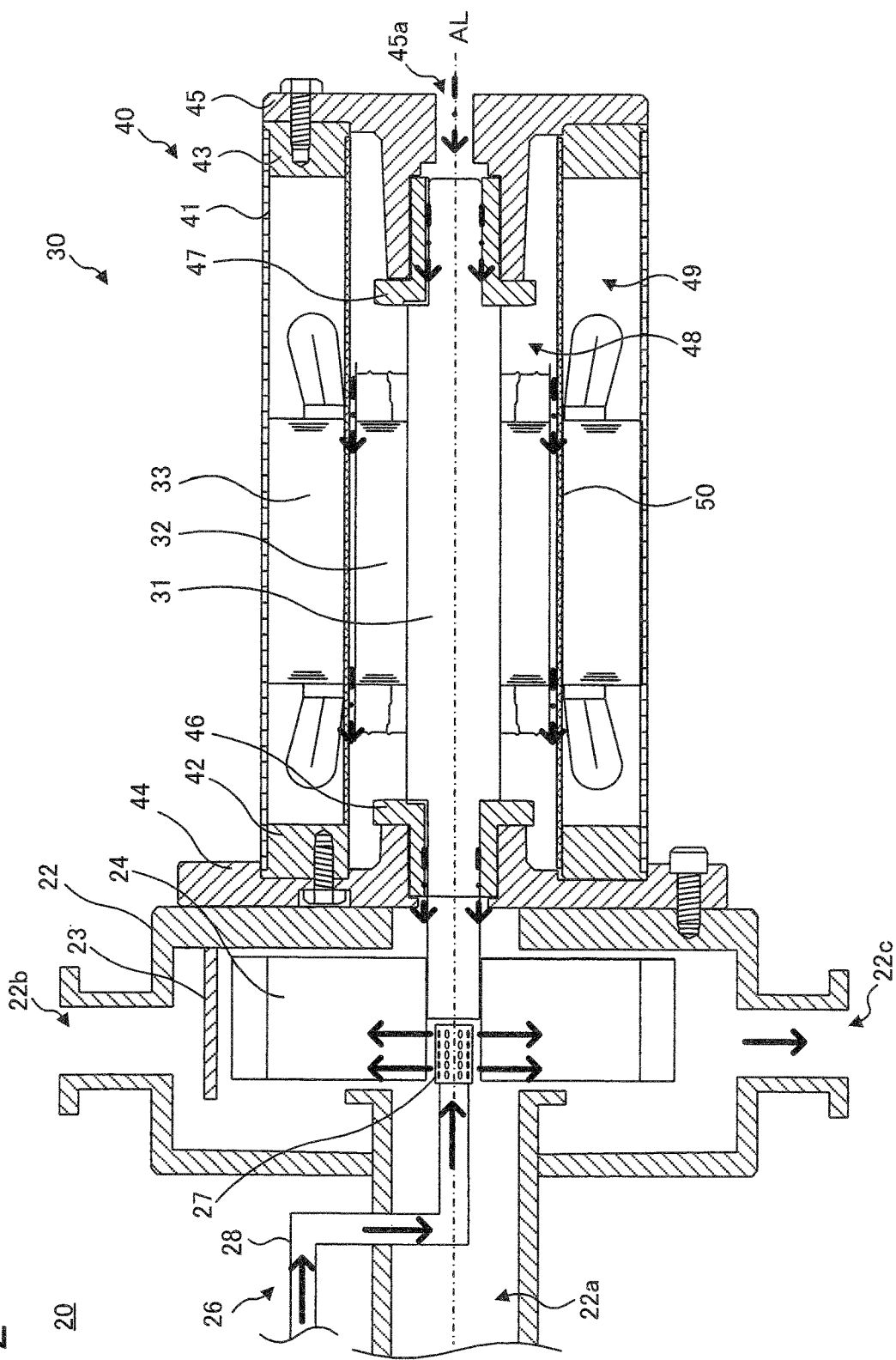
FIG. 2 is a diagram schematically showing the construction of a first embodiment of a fan scrubber.

The fan scrubber 20 provided in the vacuum pump apparatus 10 in the present embodiment will be described below in detail. FIG. 2 is a diagram schematically showing the construction of a first embodiment of the fan scrubber. Thick-line arrows in FIG. 2 indicate paths for a cleaning liquid ejected from a nozzle 27, and thick-dot-dash-line arrows indicate paths for a cleaning liquid passing through a canned motor 30. The fan scrubber 20 according to the present embodiment draws in the gas ejected from the vacuum pump 12 through a gas draw-in port 22a. The fan scrubber 20 removes a foreign substance such as a solidified material contained in the gas drawn in and supplies the processed gas from a gas ejection port 22b to the abatement apparatus 14. The fan scrubber 20 has a casing 22, a fan 24, a liquid ejection part 26 and the canned motor 30.

In the casing 22, the paths for the gas to be processed are defined. The gas draw-in port 22a through which the gas from the vacuum pump 12 is led to the fan 24 in the casing 22, the gas ejection port 22b through which the gas drawn in is ejected and a liquid discharge port 22c through which the cleaning liquid is ejected as a waste liquid are formed in the casing 22. In the present embodiment, the gas draw-in port 22a is formed in a side surface of the casing 22 and leads the gas from the vacuum pump 12 along a rotating shaft AL of the fan 24. Also, in the present embodiment, the gas ejection port 22b is formed in an upper surface of the casing 22 while the liquid discharge port 22c is formed in a lower surface of the casing 22. The present invention, however, is not limited to this example. The gas draw-in port 22a, the gas ejection port 22b and the liquid discharge port 22c may be formed in other positions in the casing 22 according to one's demand. In each of the gas draw-in port 22a, the gas ejection port 22b and the liquid discharge port 22c, a slope or the like may be formed to enable the fluid or the foreign substance to flow smoothly.

The fan 24 is disposed in the casing 22. The fan 24 is attached to a main shaft 31 of the canned motor 30 and is rotated by motive power from the canned motor 30 to agitate in the casing 22. The fan 24 may be of any construction as long as it can agitate the gas drawn into the casing 22 through the gas draw-in port 22a and lead the gas to the gas ejection port 22b. For example, the fan 24 can be of a construction having two side plates in the form of disks opposed to each other and a plurality of vanes fixed between these side plates.

A liquid ejection part 26 is provided in the casing 22. Through the liquid ejection part 26, the cleaning liquid is jetted into the casing 22. Water, for example, can be used as the cleaning liquid. The efficiency with which a foreign substance is captured can be improved by using as the cleaning liquid an alkaline liquid containing a liquid hydroxide (e.g., sodium hydroxide or potassium hydroxide). Corrosion of the casing 22 and the fan 24 can also be inhibited by using such a liquid. The cleaning liquid may be determined depending on a foreign substance to be captured.

The liquid ejection part 26 has the nozzle 27 having a plurality of jet holes formed therein and a liquid supply tube 28 communicating with the nozzle 27. In the liquid ejection part 26, the cleaning liquid is supplied to the nozzle 27 through the liquid supply tube 28 by a pressure feed mechanism (not shown) to be ejected from the nozzle 27. In the present embodiment, the nozzle 27 is provided inside the fan 24 by being opposed to the rotating shaft of the fan 24 (the main shaft 31 of the canned motor 30) to eject the cleaning liquid from the center of the fan 24 toward the periphery of the fan 24. The liquid supply tube 28 is provided by being extended in the gas draw-in port 22a so as not to hinder the rotation of the fan 24.

A collision plate 23 is formed between the fan 24 and the gas ejection port 22b in the casing 22. While the cleaning liquid jetted from the nozzle 27 is scattered to the periphery by the centrifugal force of the fan 24, the provision of the collision plate 23 enables inhibiting the cleaning liquid from entering the gas ejection port 22b. The collision plate 23 may be not only formed between the fan 24 and the gas ejection port 22b but also formed, for example, so as to generally cover the entire periphery of the fan 24.

The canned motor 30 has its main shaft 31 coupled to the fan 24 and provides rotational drive force to the fan 24. The main shaft 31 and the fan 24 rotate on an axial line AL. As illustrated, the canned motor 30 has the main shaft 31, a rotor 32, a stator 33, a motor casing 40 and a can 50.

The rotor 32 has a construction in which a secondary conductor is electrically connected to the rotor core. Also, the stator 33 has a construction in which a winding is attached around a stator core. Portions of the winding are exposed outwardly from the stator core at opposite ends of the stator 33 in the axial line AL direction. In the canned motor 30, the rotor 32 and the main shaft 31 are rotated by electromagnetic induction caused by energization through the winding on the stator 33.

The motor casing 40 includes a stator frame 41, frame side plates 42 and 43 and brackets 44 and 45. The stator frame 41 has a cylindrical shape in which an internal space is formed along the axial line AL. The stator 33 is disposed in the stator frame 41. The stator 33 is fixed in the stator frame 41 coaxially with the axial line AL by fitting the stator core in the stator frame 41. The rotor 32 is disposed coaxially on the inner circumferential side of the stator 33.

The can 50 is provided between the rotor 32 and the stator 33. The can 50 separates the rotor 32 and the stator 33 from each other. That is, the can 50 partitions the interior of the motor casing 40 into a rotor chamber 48 in which the rotor 32 is disposed and a stator chamber 49 in which the stator 33 is disposed. The can 50 is formed into a cylindrical shape extending along the axial line AL. The axial line AL is also an axis line of the can 50. The can 50 is open (having openings) at its opposite ends in the axial line AL direction. The can 50 thus formed is attached to an inner surface of the stator 33 (more specifically the stator core), with a small gap formed between the can 50 and the motor rotor 32.

The frame side plates 42 and 43 are disposed at the opposite end sides of the can 50 in the axial line AL direction. The frame side plates 42 and 43 each have a generally cylindrical shape. The frame side plates 42 and 43 are fitted between the stator frame 41 and the can 50 at the opposite ends of the canned motor 30 in the axial line AL direction. The stator chamber 49, which is a space in which the stator 33 is housed, is enclosed with the stator frame 41, the can 50 and the frame side plates 42 and 43.

The frame side plates 42 and 43 are fastened to the brackets 44 and 45 at the opposite end sides of the canned motor 30 in the axial line AL direction. The rotor chamber 48, which is a space in which the rotor 32 is housed, is defined by the can 50 and the brackets 44 and 45. At the fan 24 side (load side), the frame side plate 42 is fastened to the bracket 44. In the present embodiment, the bracket 44 at the load side is directly coupled to the casing 22. A through hole for insertion of the main shaft 31 is formed in the bracket 44 at the load side, and a slide bearing 46 for axially supporting the main shaft 31 is provided in this through hole. The frame side plate 43 is fastened to the bracket 45 at the end opposite from the fan 24 (at the counter load side). A slide bearing 47 for axially supporting the main shaft 31 is provided in the bracket 45 at the counter load side. In the present embodiment, a through hole (liquid inflow port) 45a is formed in the bracket 45 at the counter load side to provide communication between the slide bearing 47 and the outside. A pressure feed mechanism (not shown) for supplying the cleaning liquid into the rotor chamber is connected to the through hole 45a.

Figure 3:
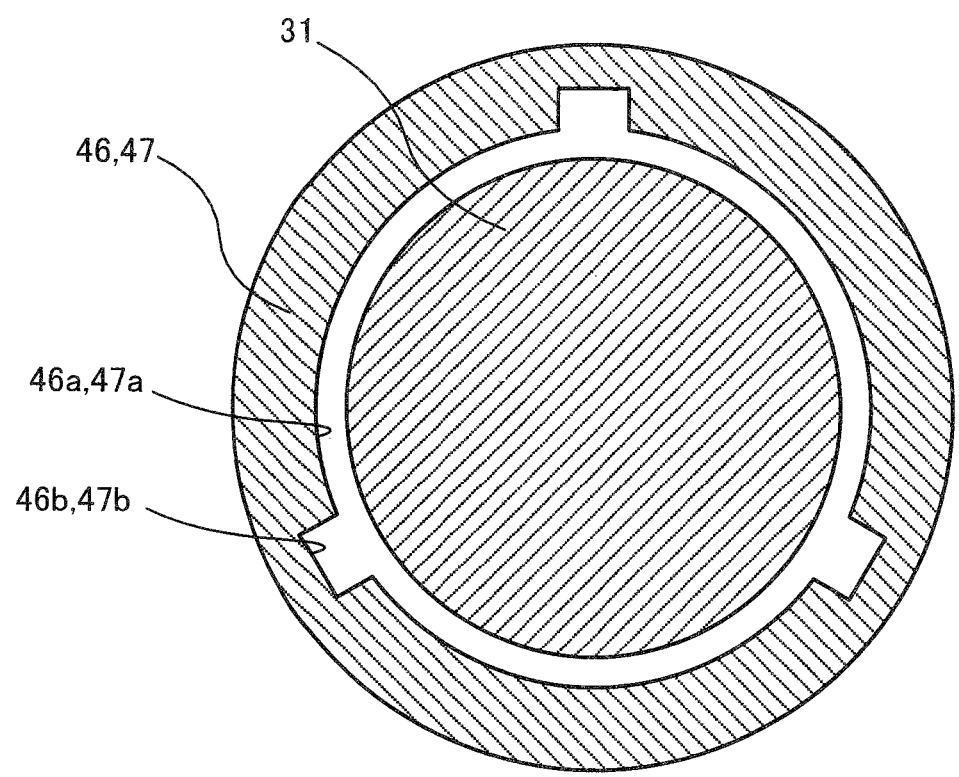
FIG. 3 is a diagram showing an example of a section of slide bearings and a main shaft.

FIG. 3 is a diagram showing an example of a section of the slide bearings and the main shaft. In the present embodiment, the slide bearings 46 and 47 support the main shaft 31 with its slide surfaces 46a and 47a and with the cleaning liquid for the fan scrubber 20 used as an operating fluid. Recesses 46b and 47b are formed in the slide surfaces 46a and 47a of the slide bearings 46 and 47 in the present embodiment. In the example shown in FIG. 3, three recesses 46b and 47b are formed at positions uniformly set along the circumferential direction. The recesses 46b and 47b may have a rectangular sectional shape, as shown in FIG. 3, and may alternatively have, for example, a V-shaped or semi-circular sectional shape.

When the cleaning liquid is supplied to the slide bearing 47 at the counter load side from the pressure feed mechanism (not shown) through the through hole (liquid inflow port) 45a, the cleaning liquid moves into the rotor chamber 48 by passing through the gap between the slide bearing 47 and the main shaft 31, as indicated by the thick-dot-dash-line arrows in FIG. 2. Subsequently, the cleaning liquid moves toward the slide bearing 46 at the load side by passing through the gap between the rotor 32 and the can 50 in the rotor chamber 48. The cleaning liquid then passes through the gap between the slide bearing 46 and the main shaft 31 (liquid ejection port) to be discharged into the casing 22.

In the present embodiment of the fan scrubber 20 described above, the rotor 32 and the stator 33 of the canned motor 30 are separated from each other by the can 50. Therefore, even when the gas in the casing 22 enters the interior of the canned motor 30 through the slide bearing 46 at the load side, the gas having entered can be prevented from contacting the stator 32 and degradation of the stator 32 can be prevented. Damage by the gas in the casing 22 to the motor driving the fan 24 can thus be inhibited.

In the fan scrubber 20, the cleaning liquid is supplied into the rotor chamber 48 through the through hole 45a and the slide bearing 47 and is ejected into the casing 22 through the slide bearing 46, thereby enabling the cleaning liquid as an operating fluid for the slide bearing 47 to be processed by being discharged together with the cleaning liquid ejected from the nozzle 27. Also, cooling of the canned motor 30 can be performed by causing the cleaning liquid to flow in the rotor chamber 48. Further, the ejection of the cleaning liquid from the rotor chamber 48 into the casing 22 through the slide bearing 46 enables inhibiting the gas from entering the rotor chamber 48 from the casing 22.

In the fan scrubber 20, the bracket 44 in the motor casing 40 and the casing 22 are directly coupled to each other, thereby enabling easily securing the airtightness between the casing 22 and the motor casing 40 and inhibiting the gas drawn into the casing from leaking to the outside. As a result, the fan scrubber 20 can be made simple in construction, for example, in comparison with a case where nitrogen purge from the gap between the casing 22 and the motor casing 40 toward the interior of the casing 22 is performed. The motor casing 40 and the casing 22 may be coupled, for example, by fastening with screws, bonding with an adhesive or welding.

In the fan scrubber 20, the fan 24 is directly attached to the main shaft 31 of the canned motor 30. That is, since no such power transmission mechanism as a shaft coupling exists between the main shaft 31 and the fan 24, there is no possibility of the gas or the liquid leaking from a power transmission mechanism or the like. Also, the fan scrubber 20 can easily be manufactured without performing alignment between the fan 24 and the main shaft 31.

Second Embodiment

Figure 4:
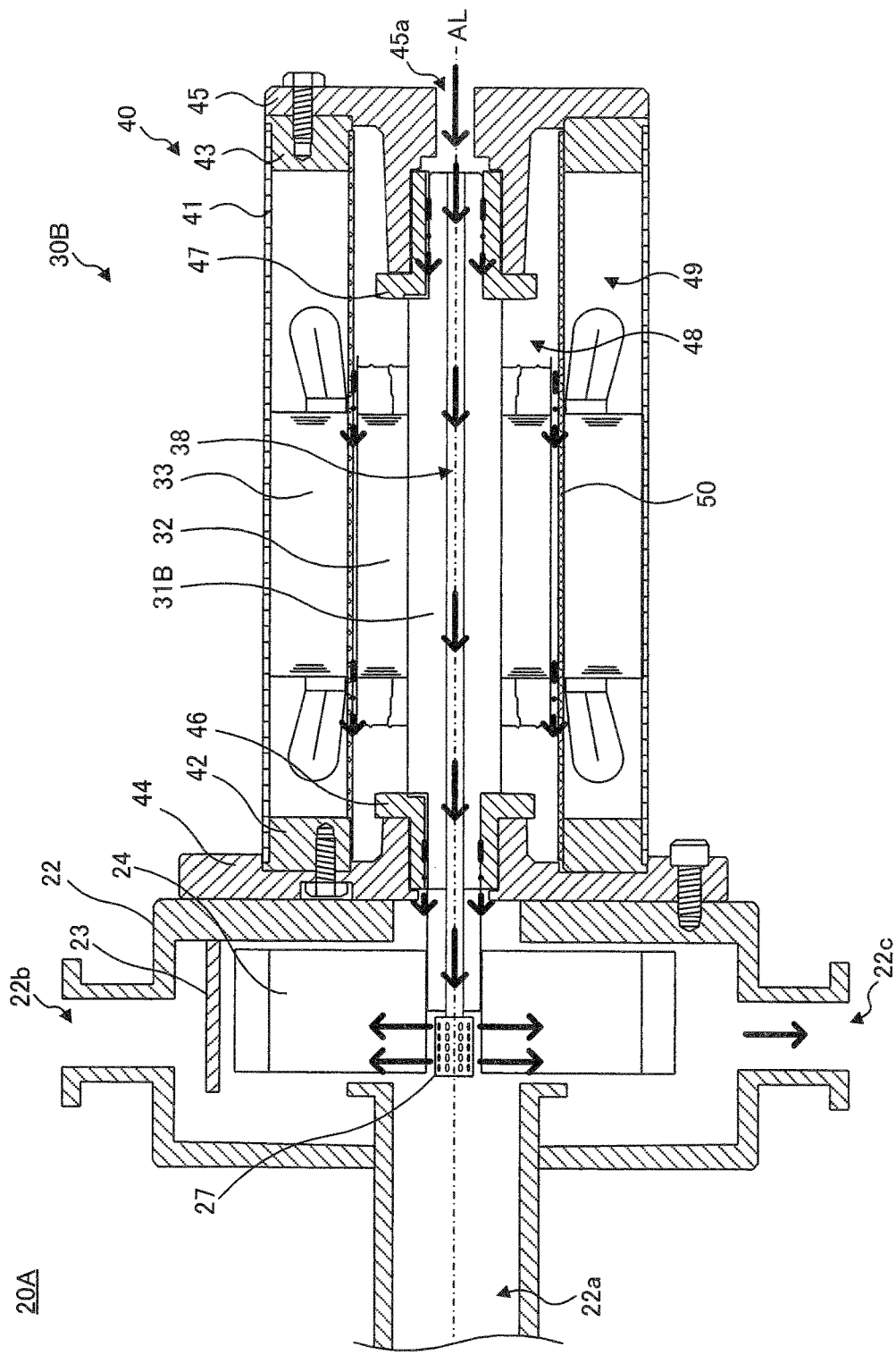
FIG. 4 is a diagram schematically showing the construction of a second embodiment of the fan scrubber.

FIG. 4 is a diagram schematically showing the construction of a second embodiment of the fan scrubber. A fan scrubber 20A according to the second embodiment has a path for supply of the cleaning liquid to the nozzle 27 different from that of the first embodiment. In other respects, the fan scrubber 20A according to the second embodiment is the same as the first embodiment.

In the fan scrubber 20A according to the second embodiment, a through hole 38 is formed at a center of the main shaft 31B of a canned motor 30B. That is, the main shaft 31B is formed so as to be hollow. The fan scrubber 20A according to the second embodiment has an inner portion (through hole 38) of the main shaft 31B provided as a liquid supply path, and the cleaning liquid is supplied to the nozzle 27 through the inner portion of the main shaft 31B.

In general, the slide bearings 46 and 47 function even when the amount of operating fluid is not substantially large. It is, therefore, preferable to set the opening area the jet holes of the nozzle 27 larger than that of the liquid ejection port (see the gap between the slide bearing 46 and the main shaft 31 in FIG. 3) connecting the rotor chamber 48 and the casing 22, in order that a sufficiently amount of the cleaning liquid jetted from the nozzle 27 can be secured.

In the fan scrubber 20 according to the first embodiment, as described above, the liquid supply tube 28 is provided in the gas draw-in port 22a. In this case, there is a possibility of a solidified material being produced as a result of cooling of the gas flowing through the gas draw-in port 22a with the cleaning liquid flowing through the liquid supply tube 28 and deposited in the gas draw-in port 22a. In the fan scrubber 20A according to the second embodiment, the cleaning liquid is supplied from the canned motor 30A side to the nozzle 27, thus enabling inhibition of the deposition of a foreign substance in the gas draw-in port 22a. Also, in the fan scrubber 20A, the cleaning liquid can be supplied from the through hole 45a of the bracket 45 on the counter load side to the nozzle 27 and the rotor chamber 48, thus enabling simplification of the path for the cleaning liquid and space saving in the fan scrubber 20A.

Third Embodiment

Figure 5:
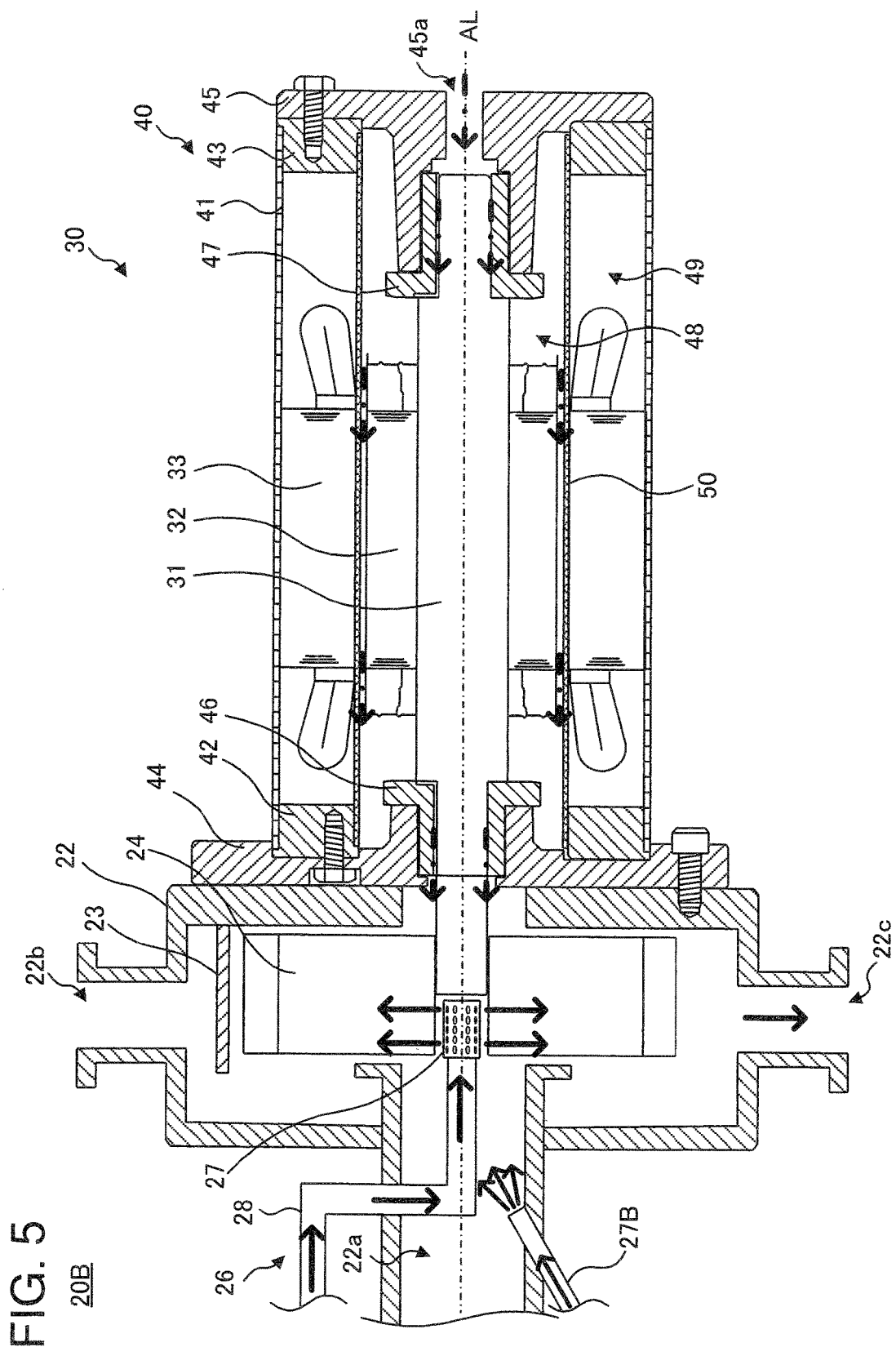
FIG. 5 is a diagram schematically showing the construction of a third embodiment of the fan scrubber.

FIG. 5 is a diagram schematically showing the construction of a third embodiment of the fan scrubber. A fan scrubber 20B according to the third embodiment differs from the first embodiment in having a second nozzle 27B. In other respects, the fan scrubber 20B according to the third embodiment is the same as the first embodiment.

The fan scrubber 20B according to the third embodiment has the second nozzle 27B from which the cleaning liquid is jetted into the gas draw-in port 22a. As shown in FIG. 5, the second nozzle 27B is provided in the gas draw-in port 22a and the cleaning liquid is supplied from a pressure feed mechanism (not shown) to the second nozzle 27B. More specifically, the second nozzle 27B is provided on the upstream side of the place in the gas draw-in port 22a where the liquid supply tube 28 is disposed. This arrangement enables inhibiting the deposition of a foreign substance in the gas draw-in port 22a by jetting the cleaning liquid from the second nozzle 27B even when a solidified material is produced as a result of cooling of the gas in the vicinity of the liquid supply tube 28.

Fourth Embodiment

Figure 6:
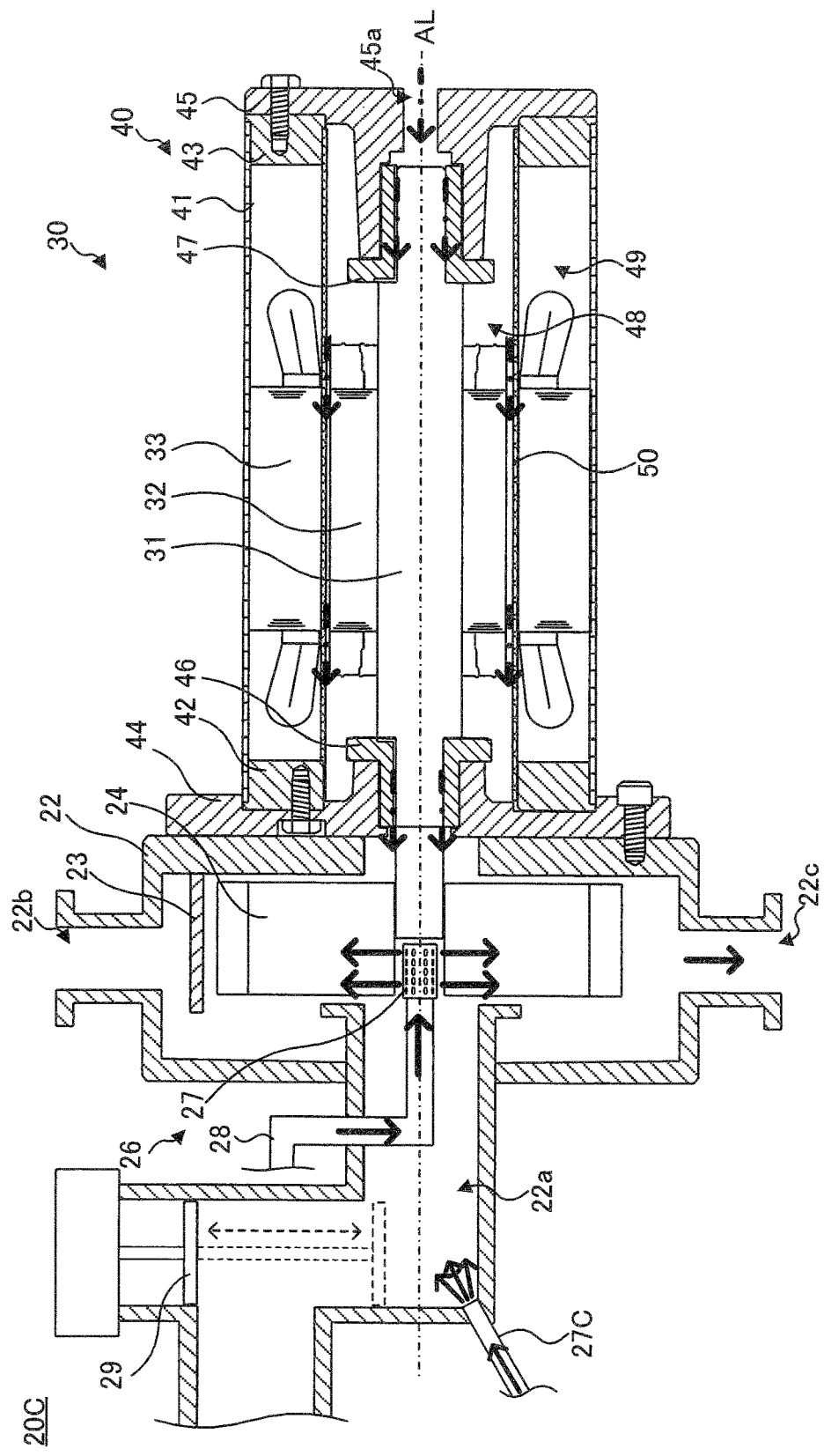
FIG. 6 is a diagram schematically showing the construction of a fourth embodiment of the fan scrubber.

FIG. 6 is a diagram schematically showing the construction of a fourth embodiment of the fan scrubber. A fan scrubber 20C according to the fourth embodiment differs from the first embodiment in having a scraper 29 and a third nozzle 27C. In other respects, the fan scrubber 20C according to the fourth embodiment is the same as the first embodiment.

The fan scrubber 20C according to the fourth embodiment has the scraper 29 which moves along an inner wall surface of the gas draw-in port 22a. For example, the scraper 29 is linearly moved in the gas draw-in port 22a by an actuator (not shown), as indicated by broken lines in FIG. 6. The scraper 29 scrapes inner wall surfaces of the gas draw-in port 22a while moving in the gas draw-in port 22a, thereby pushing downstream a foreign substance deposited in the gas draw-in port 22a. The provision of the scraper 29 in this way enables inhibition of the deposition of a foreign substance in the gas draw-in port 22a. It is preferable that the fan scrubber 20C be provided at the position at which the passage for the gas is vertically formed as shown in FIG. 6. The provision of the fan scrubber 20C in this way enables a foreign substance scraped by the scraper 29 to move downstream under gravity.

The fan scrubber 20C also has the third nozzle 27C from which the cleaning liquid is jetted toward a position downstream of the scraper 29. The cleaning liquid is supplied from a pressure feed mechanism (not shown) to the third nozzle 27C. The third nozzle 27C may be arranged to eject the cleaning liquid, for example, toward the furthest downstream position in the region through which the scraper 29 can move. Alternatively, in a case where the scraper 29 is vertically moved as shown in FIG. 6, the third nozzle 27C may be provided below the scraper 29. Such an arrangement enables a foreign substance pushed downstream by the scraper 29 to be flown downstream by the cleaning liquid jetted from the third nozzle 27C. As a result, the deposition of the foreign substance in the gas draw-in port 22a can be inhibited more effectively.

Modified Examples

In the above-described fan scrubber 20, the cleaning liquid discharged into the casing 22 via the rotor chamber 48 is directly discharged through the liquid discharge port 22c. However, the fan scrubber 20 may alternatively be arranged so that the cleaning liquid having passed through the rotor chamber 48 is jetted out from the nozzle 27.

While the cleaning liquid jetted from the nozzle 27 and the cleaning liquid passing through the rotor chamber 48 are assumed to be the same in the above-described fan scrubber 20, liquids different from each other may be used as the cleaning liquid. For example, the fan scrubber 20 may alternatively be arranged so that lubricating oil or cooling water flows through the rotor chamber 48. Also, while the liquid having passed through the rotor chamber 48 is discharged into the casing 22 in the above-described fan scrubber 20, the liquid may be discharged to the outside.

In the above-described fan scrubber 20, the slide bearings 46 and 47 having the recesses 46b and 47b formed in the slide surfaces 46a and 47a are used as bearings for the main shaft 31. However, recesses may be formed in a periphery surface of the main shaft 31 in place of or in addition to the slide surfaces 46a and 47a of the slide bearings 46 and 47. Slide bearings having no recesses 46b and 47b formed in their surfaces may alternatively be used. Other bearing components such as ball bearings may further be used in place of or in addition to the slide bearings.

In the above-described vacuum pump apparatus 10, the fan scrubber 20 and the abatement apparatus 14 are provided in stages subsequent to the vacuum pump 12. However, some other component may further be provided. The fan scrubber 20 may be provided in a stage subsequent to the abatement apparatus 14. In the above-described vacuum pump apparatus 10, the cleaning liquid used in the fan scrubber 20 is introduced into the abatement apparatus 14. However, the arrangement may alternatively be such that the liquid used in the abatement apparatus 14 is supplied, for example, to the nozzle 27 in the fan scrubber 20. Further, reuse of the waste liquid may not be made.

The embodiments and the modified Examples described above include the following technical idea.

A fan scrubber comprising a casing having a gas draw-in port and a gas ejection port, a fan disposed in the casing, a nozzle from which a liquid is jetted into the casing, and a canned motor connected to the fan. The canned motor has a main shaft connected to the fan, a rotor which rotates integrally with the main shaft, a stator disposed on a periphery of the rotor, a motor casing in which the rotor and the stator are housed, and a can which partitions an interior of the motor casing into a rotor chamber in which the rotor is disposed and a stator chamber in which the stator is disposed.

In this arrangement, the fan scrubber has the rotor chamber and the stator chamber partitioned by the can, thereby ensuring that, even when a gas enters the interior of the motor through a bearing of the main shaft, the gas does not enter the stator chamber, and that degradation of the stator can be inhibited.

The canned motor may further have a liquid inflow port which provides communication between the rotor chamber and the outside, and through which a liquid is supplied into the rotor chamber, and a liquid ejection port which provides communication between the rotor chamber and the casing, and through which the liquid in the rotor chamber is discharged into the casing.

With this arrangement, the liquid can be caused to flow in the rotor chamber and to be discharged into the casing, thereby enabling cooling of the motor or lubrication of bearings for the rotating shaft as well as processing of the discharged liquid and the liquid jetted from the nozzle.

The casing and the motor casing may be directly fastened to each other.

By doing so, the airtightness between the casing and the motor casing can easily be secured, thereby enabling inhibiting a gas drawn into the casing from leaking to the outside.

The fan may be directly attached to the main shaft.

Dosing so enables power transmission between the fan and the main shaft without a power transmission mechanism such as a shaft coupling. Prevention of leakage of the gas and the liquid out of a power transmission mechanism can thus be achieved. Also, the fan scrubber can easily be manufactured without performing alignment between the fan and the main shaft.

In the main shaft, a liquid supply path which communicates with the nozzle and through which the liquid is supplied to the nozzle may be formed.

By doing so, simplification of the passage for the liquid and space saving are enabled in comparison with a case where piping for supplying the liquid to the nozzle is separately provided.

The fan scrubber may further include a liquid supply tube which communicates with the nozzle by extending through the gas draw-in port in the casing, and through which the liquid is supplied to the nozzle, and a second nozzle provided upstream of a place in the gas draw-in port where the liquid supply tube is disposed, the liquid being jetted from the second nozzle into the gas draw-in port.

This is based on a phenomenon in which the gas flowing in the vicinity of the liquid supply tube can solidify easily by being cooled. The provision of the second nozzle upstream of the place in the gas draw-in port where the liquid supply tube is disposed enables inhibition of the deposition of a foreign substance in the gas draw-in port.

The fan scrubber may further include a scraper which moves along an inner wall surface of the gas draw-in port, and a third nozzle through which the liquid is jetted toward a position downstream of the scraper.

If this arrangement is adopted, the deposition of a foreign substance in the gas draw-in port can be inhibited by the scraper and the third nozzle.

An alkaline liquid may be jetted out from the nozzle.

The rate of removal of some kind of foreign substance can be increased thereby. Also, corrosion of the casing, the fan and other components can be inhibited.

There is also provided a vacuum pump apparatus including the above-described fan scrubber and a vacuum pump which evacuates a gas from a vacuum chamber, and which ejects the gas into the gas draw-in port of the fan scrubber.

This vacuum pump apparatus can also have the same advantages as those of the fan scrubber described above.

The vacuum pump apparatus may further include a abatement apparatus connected to the gas ejection port of the fan scrubber, and the abatement apparatus may remove, by using the liquid jetted from the nozzle, a foreign substance and a predetermined gas contained in the gas ejected from the fan scrubber.

This arrangement enables the liquid jetted out from the nozzle of the fan scrubber to be reused in the abatement apparatus.

While the embodiments of the present invention have been described, the above-described embodiments of the invention are not for limiting the present invention but for facilitating understanding of the present invention. Needless to say, the present invention can be changed and modified without departing from its gist, and the present invention encompasses its equivalents. Also, arbitrary combinations of the embodiments and modified examples are possible as long as at least part of the above-described problems can be solved or as long as at least part of the effects can be achieved, and arbitrary combinations of the components described in the appended claims and the specification or omissions of some of the components can be made.

This application claims priority under the Paris Convention to Japanese Patent Application No. 2015-135140 filed on May 11, 2015. The entire disclosure of Japanese Patent Application No. 2015-096248 filed on Jul. 6, 2015 including specification, claims, drawings and summary is incorporated herein by reference in its entirety. The entire disclosure of Japanese Patent Application No. 2003-251130 (Patent Document 1) including specification, claims, drawings and summary is incorporated herein by reference in its entirety.

REFERENCE SIGNS LIST

10 Vacuum pump apparatus
12 Vacuum pump
14 Abatement apparatus
20, 20A to 20C Fan scrubber
22 Casing
22*a* Gas draw-in port
22*b* Gas ejection port
22*c* Liquid discharge port
23 Collision plate
24 Fan
26 Liquid ejection part
27 Nozzle
27B Second nozzle
27C Third nozzle
28 Liquid supply tube
29 Scraper
30, 30B Canned motor
31 31B Main Shaft

32 Rotor
33 Stator
38 Through hole
40 Motor casing
41 Stator frame
42, 43 Frame side plate
44, 45 Bracket
45*a* Through hole
46, 47 Slide bearing
48 Rotor chamber
49 Stator chamber

What is claimed is:

1. A fan scrubber comprising:
    a casing having a gas draw-in port and a gas ejection port;
    a fan disposed in the casing;
    a nozzle from which a liquid is jetted into the casing; and
    a canned motor having a main shaft connected to the fan, a rotor which rotates integrally with the main shaft, a stator disposed on a periphery of the rotor, a motor casing in which the rotor and the stator are housed, and
    a can which partitions an interior of the motor casing into a rotor chamber in which the rotor is disposed and a stator chamber in which the stator is disposed,
    wherein the canned motor further includes a liquid inflow port which provides communication between the rotor chamber and the outside, and through which a liquid is supplied into the rotor chamber, and a liquid ejection port which provides communication between the rotor chamber and the casing, and through which the liquid in the rotor chamber is discharged into the casing.

2. The fan scrubber according to claim 1, wherein the casing and the motor casing are directly fastened to each other.

3. The fan scrubber according to claim 1, further comprising:
    a liquid supply tube which communicates with the nozzle by extending through the gas draw-in port in the casing, and through which the liquid is supplied to the nozzle; and
    a second nozzle provided upstream of a place in the gas draw-in port where the liquid supply tube is disposed, the liquid being jetted from the second nozzle into the gas draw-in port.

4. The fan scrubber according to claim 1, wherein an alkaline liquid is jetted out from the nozzle.

5. A vacuum pump apparatus comprising:
    the fan scrubber according to claim 1; and
    a vacuum pump which evacuates a gas from a vacuum chamber, and which ejects the gas into the gas draw-in port of the fan scrubber.

6. The vacuum pump apparatus according to claim 5, further comprising an abatement apparatus connected to the gas ejection port of the fan scrubber,
    wherein the abatement apparatus removes, by using the liquid jetted from the nozzle, a foreign substance and a predetermined gas contained in the gas ejected from the fan scrubber.

7. A fan scrubber comprising:
    a casing having a gas draw-in port and a gas ejection port;
    a fan disposed in the casing;
    a nozzle from which a liquid is jetted into the casing; and
    a canned motor having a main shaft connected to the fan, a rotor which rotates integrally with the main shaft, a stator disposed on a periphery of the rotor, a motor casing in which the rotor and the stator are housed, and
    a can which partitions an interior of the motor casing into a rotor chamber in which the rotor is disposed and a stator chamber in which the stator is disposed,
    wherein the fan is directly attached to the main shaft, and
    a liquid supply path which communicates with the nozzle and through which the liquid is supplied to the nozzle is formed in the main shaft.

8. A fan scrubber comprising:
    a casing having a gas draw-in port and a gas ejection port;
    a fan disposed in the casing;
    a nozzle from which a liquid is jetted into the casing;
    a canned motor having a main shaft connected to the fan, a rotor which rotates integrally with the main shaft, a stator disposed on a periphery of the rotor, a motor casing in which the rotor and the stator are housed, and
    a can which partitions an interior of the motor casing into a rotor chamber in which the rotor is disposed and a stator chamber in which the stator is disposed,
    a scraper which moves along an inner wall surface of the gas draw-in port; and
    a third nozzle through which the liquid is jetted toward a position downstream of the scraper.

* * * * *